Oct. 12, 1937. H. W. RUPPLE 2,095,399
AUTOMATIC METALWORKING MACHINE
Filed Jan. 28, 1935 3 Sheets-Sheet 1

INVENTOR.
HARRY W. RUPPLE
BY
Kwis Hudson & Kent
ATTORNEYS

Oct. 12, 1937.  H. W. RUPPLE  2,095,399
AUTOMATIC METALWORKING MACHINE
Filed Jan. 28, 1935  3 Sheets-Sheet 2

INVENTOR.
HARRY W. RUPPLE
BY
Kwis Hudson & Kent
ATTORNEYS

Oct. 12, 1937.   H. W. RUPPLE   2,095,399
AUTOMATIC METALWORKING MACHINE
Filed Jan. 28, 1935   3 Sheets-Sheet 3

INVENTOR.
HARRY W. RUPPLE
BY
Kwis, Hudson & Kent
ATTORNEYS

Patented Oct. 12, 1937

2,095,399

UNITED STATES PATENT OFFICE 2,095,399

AUTOMATIC METALWORKING MACHINE

Harry W. Rupple, Shaker Heights, Ohio, assignor to The Cleveland Automatic Machine Company, Cleveland, Ohio, a corporation of Ohio Application January 28, 1935, Serial No. 3,775

7 Claims. (Cl. 29—37)

The present invention relates to automatic metalworking machines of the screw machine or bar type, and more particularly to improved means for determining or gauging the feed of the work bar or stock during the feeding operation.

Machines of the general character referred to usually comprise one or a plurality of spindles, rotatably supported in the machine frame or, in the case of an indexible spindle turret type of machine, in an indexible turret. The spindles are equipped with chucks at the front or tool ends and have longitudinal apertures extending therethrough within which work bars or stock are supported while the desired machining operations are being performed on the front projecting end. Periodically the projecting end of the work bar or stock is cut off, the tools withdrawn, and the bar or stock advanced through the spindle to present a new part to the tools.

In the indexible turret type of machine, the turret which carries the spindles, is periodically indexed in predetermined timed relation to the other operations of the machine to advance the spindles successively through a plurality of tool stations at which the machining operations are performed. In this type of machine the feeding operation is performed either at one of the stations or while the spindles are being indexed from one station to another. In either the single or multiple spindle type of machine the tools are usually carried on main and/or auxiliary tool slides movable longitudinally of the spindle or spindles, and/or cross slides, head slides, etc., depending upon the particular construction of machine and the particular operations to be performed upon the work bar or stock.

In many instances it is important that the work bar or stock be advanced an exact predetermined amount at each feeding operation. For reasons well known in the art it has been found impractical to control the feed of the work bar or stock with sufficient accuracy, through control of the feeding means. To accomplish this more accurately the prior art has resorted to the use of a work bar or stock stop or gauge supported in alignment with the spindle or spindles at the feeding position. Examples of prior art machines provided with the aforesaid type of work stop or gauge are found in such United States patents as George H. Newton, No. 1,066,035, John P. Brophy No. 1,779,529, and Olaf E. Trobeck No. 1,910,192.

The prior art constructions heretofore referred to have proved only partly satisfactory since in many instances, both in single and multiple spindle machines, especially where the tooling of the machine is at all complicated, the work stop or gauge interferes with the operation of the tools or tool slides. It will be obvious even to those unskilled in the art that the space about the tool end of the spindle or spindles is necessarily congested, and this is particularly true in present day multiple spindle indexible turret types of machine, upon which operations of increasing complexity are continuously being performed. The patents referred to above illustrate what has been done in the prior art in an attempt to solve this particular problem.

An object of the present invention is the provision of a novel machine of the character referred to provided with means for determining the amount of the feed of the work bar or stock which will not be subject to the objections of the prior art.

Another object of the invention is the provision of a machine of the character referred to provided with a novel work stop or gauge for determining the amount of work bar or stock projecting from the forward end of the spindle of the machine at the termination of each feeding operation, adapted to be moved completely clear of the slides and tools, etc., immediately after it has performed its function.

Another object of the invention is the provision of a novel machine of the character referred to provided with a work stop or gauge, for determining the amount of work bar or stock projecting from the forward end of the spindle at the termination of each feeding operation, supported outside of the space immediately adjacent the spindle or spindles, slides and/or tools, etc. and movable into alignment with the work bar or stock momentarily during the feeding operation.

The invention resides in certain novel features, details of construction, and combinations and arrangements of parts, and further objects and advantages thereof will be apparent to those skilled in the art to which it pertains, some of which will be hereinafter pointed out in the following description of the preferred embodiment of the invention described with reference to the accompanying drawings, in which—

Figure 1:
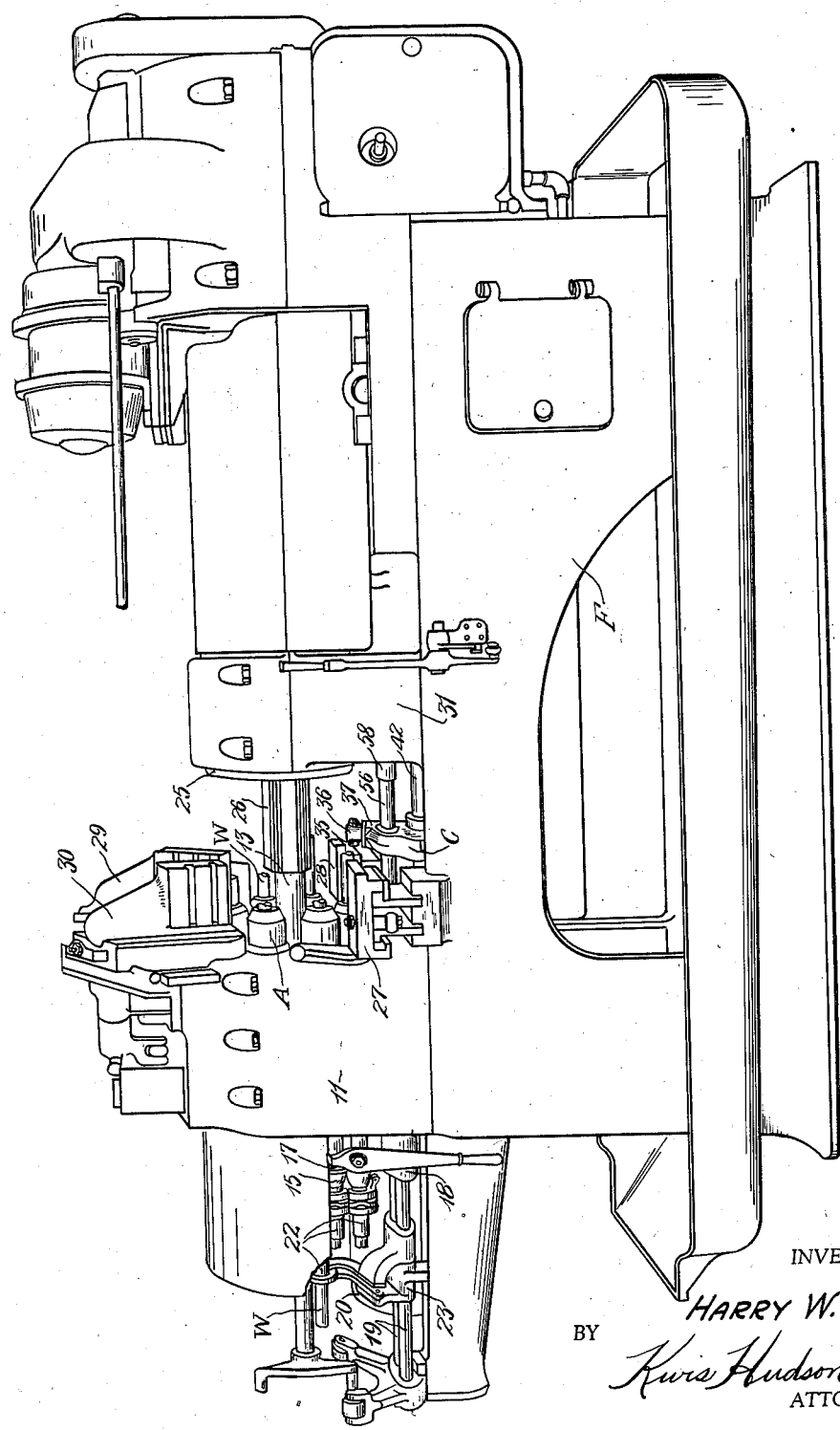
Fig. 1 is a front perspective of a multiple spindle indexible turret type of bar machine embodying the present invention.

The invention is particularly applicable to machines of the multiple work spindle indexible spindle turret type, and is herein described and illustrated as embodied in a six spindle indexible spindle turret type of "Cleveland automatic" machine. Only those parts of the machine which are necessary to a clear understanding of the invention are herein specifically illustrated and described as the remainder of the machine is old and well known in the art, wherein it may be found embodied in a plurality of different structures.

Referring to the drawings in which similar reference characters designate corresponding parts throughout the several views, a plurality of work spindles, in the present instance six, designated in general by the reference character A, are rotatably supported in longitudinal apertures in a spindle turret 10 rotatably supported in a spindle head 11 of the frame F of the machine. While it will be readily understood that any well known type of spindle turret construction may be employed, provided it comprises a plurality of rotatable spindles adapted to have work fed through the center thereof and means for periodically advancing the work through the spindles in predetermined timed relation to the other operations of the machine, etc., the indexible spindle turret illustrated herein is similar in construction to that disclosed in my copending application Ser. No. 747,128.

The spindles A are equally spaced about the axis of rotation of the turret, are identical in construction, and comprise a spindle tube rotatably supported, by suitable bearings provided with means for taking up wear etc., in the spindle turret 10, and are driven from the main drive shaft 13 of the machine in the usual manner. Chuck thimbles 15 of conventional construction are actuated at the feeding station, by the engagement of a brass shoe in an annular groove 17 formed in the periphery thereof in predetermined timed relation to the other operations of the machine to open and close the chuck collets through the medium of conventional chuck tubes etc. The brass shoe is carried by a member 18 slidably supported on parallel rods 19 fixed in the frame F, and is actuated by and under the control of a cam drum 20 attached to an auxiliary cam shaft 21 rotatably supported by the frame and driven in a manner well known in the art.

Feed tubes 22 slidably supported in the spindle tubes and provided with conventional feed collets are actuated in the feeding station in predetermined timed relation to the actuation of the chucks and the other operations of the machine to periodically advance the stock bars W through the spindles by mechanism also well known in the art and which includes a spring pressed member 23 slidably supported on the parallel rods 19 and under the control of the cam drum 20. In the embodiment of the invention herein illustrated and described the feeding operation takes place in the lower rear station, but it will be apparent to those skilled in the art that it may take place at any point in the cycle of operation.

The tools for performing the desired machining operations at the various stations are carried by or supported in a main tool slide 25, an auxiliary tool slide 26, front and rear cross slides 27 and 28, respectively, and head slides 29 and 30. The main and auxiliary tool slides 25 and 26 are slidably supported by a tool slide head 31 on the frame F, in axial alignment with the work spindle turret 10, and are reciprocated toward and from the latter in predetermined timed relation to the indexing of the turret etc. by conventional mechanism. The cross and head slides are operated as desired in a well known manner. As will be readily understood, the tools employed will depend upon the particular job being performed on the machine, and no tools whatsoever are shown in the drawings as they would obstruct the view of certain parts of the machine more important to a clear understanding of the present invention.

The amount of final forward feed movement or advance imparted to the work bar or stock at each feeding operation is determined by a work stop or gauge assembly designated in general by the reference character C. The stop proper consists of a headed member 35 secured in the upper end of a cylindrical rod 36 slidably supported in a housing 37. As illustrated the stem of the member 35 is threaded into a tapped aperture in the upper end of the rod 36 and is adjustable therein. A lock nut 38 is provided for securing the member 35 in any adjusted position. The cylindrical rod 36 is keyed in the housing 37 and has a rack 40 formed on one side continuously in mesh with a gear 41 through the medium of which it is reciprocated to project the head of the member 35 into alignment with the work bar or stock in the feeding station.

The gear 41 is rotatably supported on a short shaft 42 projecting through the housing 37, and removably supported in the opening between the turret head and the tool head of the machine, by a bushing member 44 positioned in an aperture 45 in the face of the tool head adjacent the turret, and a second member 46 positioned in an aperture 47 in the frame. A bearing sleeve 49 secured against longitudinal movement in the housing 37 is interposed between the gear 41 and the shaft 42, and bearing members 50 and 51 are interposed between the ends of the hub of the gear and the housing 37.

The gear 41 is continuously in mesh with a gear 55 located within the housing 37 and slidably keyed on a shaft 56. The shaft 56 also projects through the housing 37 in a manner similar to the shaft 42, and is supported immediately above the shaft 42 by bearing members 57 and 58, supported in apertures 59 and 60 in the turret and tool heads of the frame, respectively. Bearing members 61 and 62 are interposed between the enlarged hub of the gear 55 and the housing 37 for the usual purpose. The bearing member 62 is made sufficiently large to permit removal of the gear 55 through the side of the housing when the same is removed. A sheet metal closure 63, provided with a tubular extension 64 to accommodate the lower end of the member 36, is detachably secured to the under side of the housing 37 and prevents the entrance of chips, etc., into the housing.

Figure 2:
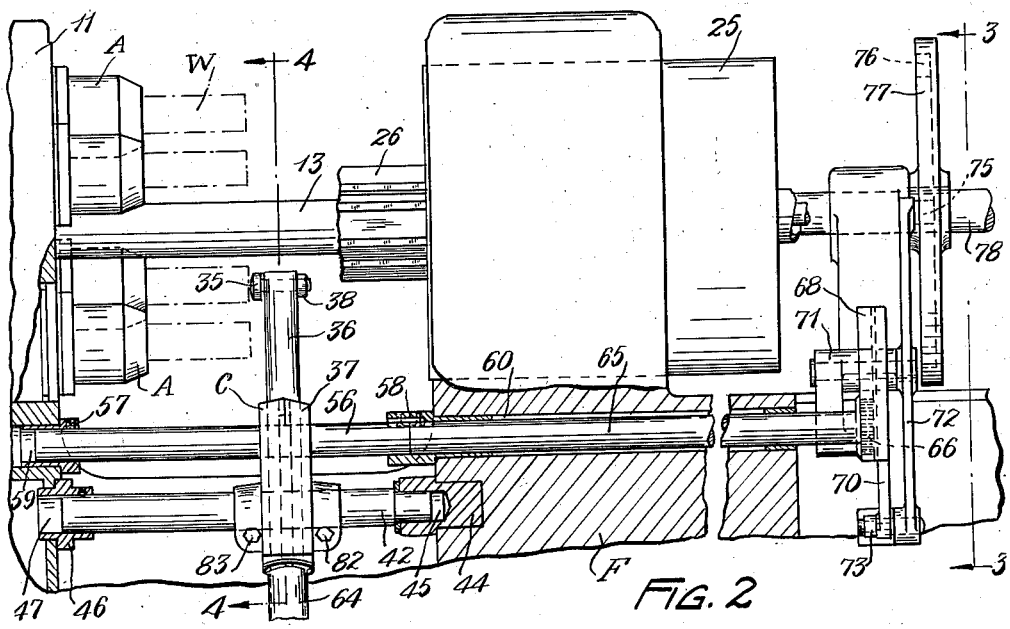
Fig. 2 is a front elevation of the machine shown in Fig. 1 with portions in section on the line 2—2 of Fig. 4.
Figure 3:
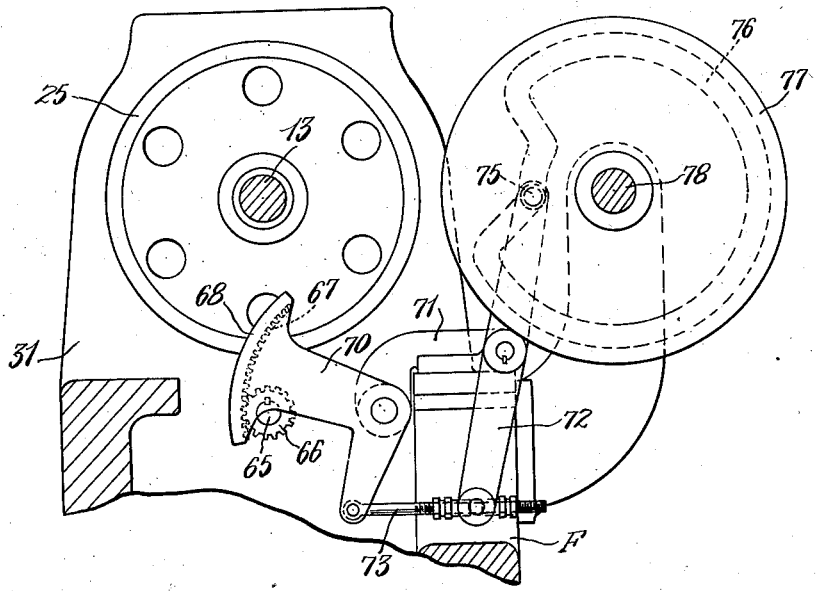
Fig. 3 is a section on the line 3—3 of Fig. 2.

The shaft 56 is keyed to the member 58 and is adapted to be intermittently rotated or oscillated by a second shaft 65 also keyed to the member 58, and supported in axial alignment therewith. The shaft 65 projects through the tool slide head toward the right, as viewed in Figs. 1 and 2, into an opening in the frame casting where it carries a gear 66 fixed to the end thereof. The gear 66 is continuously in mesh with an internal arcuate rack 67 formed integral with an enlarged head 68 on one end of a bell crank lever 70 pivotally supported by a bracket 71 secured to the frame of the machine. The other end of the bell crank lever 70 is operatively connected to the lower end of a walking beam 72, also pivotally supported by the bracket 71, through the medium of an adjustable link 73 pivotally connected thereto and to the walking beam. The upper end of the walking beam 72 carries a cam roller 75 continuously in engagement in a cam track 76 in a face cam 77 carried by the main cam shaft 78 of the machine.

The housing 37 is adjustable longitudinally of the shafts 42 and 56 to accommodate different lengths or amounts of feed and is adapted to be secured in any adjusted position by clamp members 80 and 81 located in suitable apertures in the housing 37. The clamp members 80 and 81 are moved to clamp and release the housing to and from the shaft 42 by bolts 82 and 83 extending therethrough. In setting up the machine an approximation of the desired feed is obtained by positioning the housing 37 along the shafts 42 and 56 after which a final adjustment is secured by turning the member 35 in the rod 36. To avoid the accumulation of chips on the top of the housing 37 it will be noted that the same is sloped (see Fig. 1) so as to cause the chips to fall on through the machine.

Figure 4:
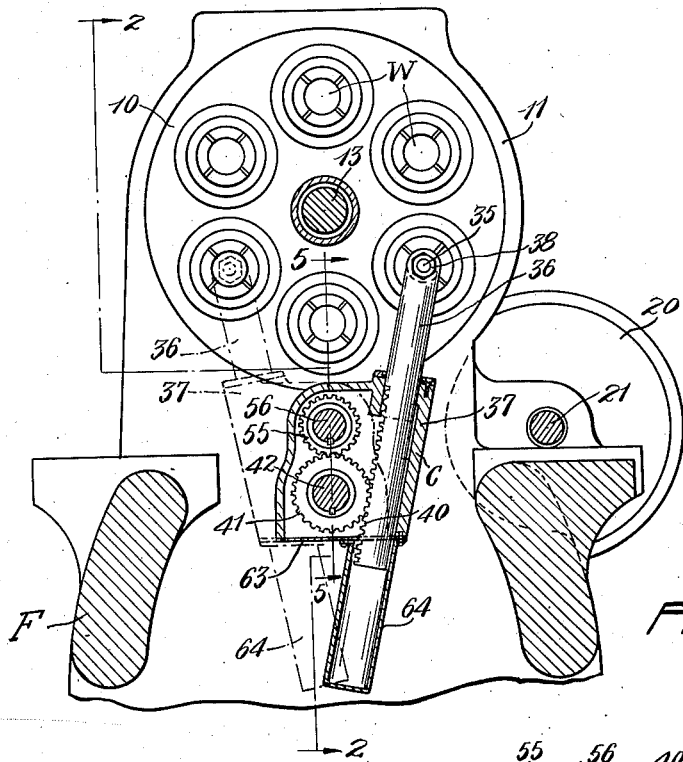
Fig. 4 is a section on the line 4—4 of Fig. 2.
Figure 5:
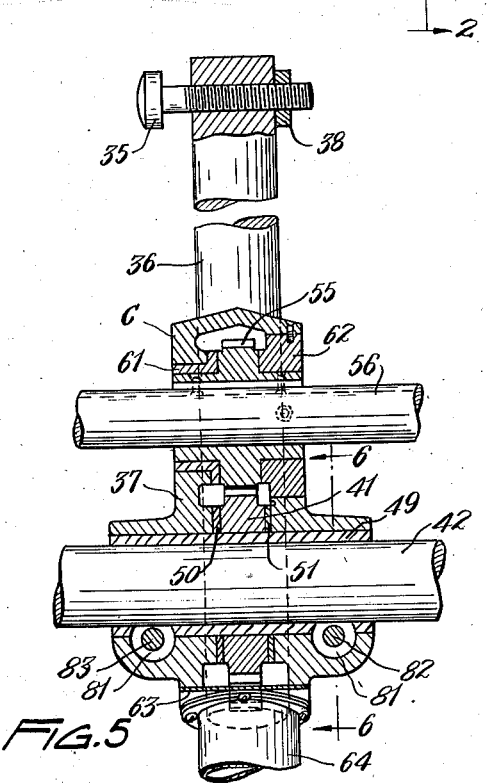
Fig. 5 is a section on the line 5—5 of Fig. 4.
Figure 6:
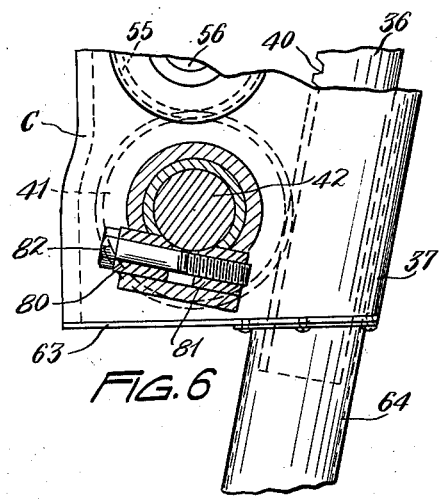
Fig. 6 is a section on the line 6—6 of Fig. 5.

The shafts 42 and 56 are on the vertical center line of the machine and the construction is such that when the housing 37 is reversed and the member 35 threaded into the rod 36 in a reverse direction, as shown in dot and dash line in Fig. 4, the work stop or gauge will operate in the lower front station. When operating in the lower front station it will be understood the direction of rotation of the gear 41 must be the reverse of that employed when operating in the lower rear station. Preferably this is accomplished by the substitution of a different cam from the one shown, although it may be accomplished in other ways, such as the use of an external rack in place of the internal rack 67, etc. The lower front or rear stations are the stations in which the feeding operation is usually performed, but if it is desired to perform the feeding operation at any other point in the cycle of operation it will be apparent that the work stop or gauge assembly can be located or positioned at any other desired or convenient place. If desired, the shafts 42 and 56 can be positioned lower in the frame to give more space or clearance than that shown.

It is believed that the operation of the machine will be apparent from the foregoing description thereof. Suffice it to say that the stop proper 35 is reciprocated in a straight line, in predetermined timed relation to the feeding operation, into and out of alignment with the spindle in the feeding position momentarily during the feeding operation. The stop can be raised simultaneously with the movement of the work through the spindle and is preferably held in its up position until the work bar or stock has been clamped by the collet chuck, thus avoiding any possibility of error in the feed due to vibration, etc. The straight line reciprocation of the work stop or gauge into and out of alignment with the spindle during the feeding operation provides minimum interference with the other operations of the machine and leaves a maximum of clear or open space available for the positioning of the tools, etc.

In the event that it is desired to use an over- feeding arrangement as is customary in some instances in the prior art (see U. S. patent to Brophy previously referred to) provision can be made for reciprocating the shaft 42 in predetermined timed relation to the other operations of the machine. In this event the shaft 42 is preferably extended toward the right as viewed in Figs. 1 and 2, and reciprocated from the main cam shaft of the machine by any convenient lever mechanism. The positioning of the operating mechanism as suggested removes the same from the space underneath the tools, where its operation would be interfered with by chips, etc.

From the foregoing description of the preferred embodiment of the invention it is evident that the objects of the invention have been attained, that a new, novel and improved machine of the character referred to has been produced, and that a new, novel and improved gauge stock for machines of the character referred to, which will give a maximum of unobstructed or free space for the positioning of the tools, has also been provided.

The preferred embodiment of the invention has been illustrated and described, but I do not wish to be limited to the particular construction shown, which may be varied within the scope of the invention. This application is intended to cover all adaptations, modifications and uses of the present invention as come within the practice of those skilled in the art to which it pertains, and I particularly point out and claim as my invention the following:

1. A metalworking machine comprising a chuck adapted to have work fed through the center thereof, means for feeding work through said chuck, a housing adjustably supported adjacent said chuck, a work stop or gauge member slidably supported by said housing, a rack on said stop or gauge member, a gear rotatably supported in said housing and in mesh with said rack, and means for intermittently oscillating said gear whereby said work stop or gauge is reciprocated into and out of a position in alignment with said chuck.

2. A metalworking machine comprising a frame, a turret rotatably supported by said frame, a plurality of work spindles adapted to have work fed through the center thereof rotatably supported by said turret and spaced equally about the axis of rotation thereof, means for intermittently rotating said turret whereby said spindles are indexed through a plurality of stations, means for feeding work through said spindles, a housing supported by said frame below said turret, a work stop or gauge member slidably supported by said housing, and means within said housing for reciprocating said member whereby the same may be moved into a position in alignment with said spindles momentarily during the feeding operation.

3. A metalworking machine comprising a frame, a turret rotatably supported by said frame, a plurality of work spindles adapted to have work fed through the center thereof rotatably supported by said turret and spaced equally about the axis of rotation thereof, means for intermittently rotating said turret whereby said spindles are indexed through a plurality of stations, means for feeding work through said spindles at one of said stations, a housing adjustably supported by said frame to one side of and below said turret, a member slidably supported by said housing, an adjustable stop at the upper end of said member, a rack on the lower end of said member, a gear rotatably supported in said housing and in mesh with said rack, and means for intermittently oscillating said gear whereby said stop is moved into and out of a position in alignment with the spindle in the loading station.

4. A metalworking machine comprising a chuck adapted to have work fed through the center thereof, means for feeding work through said chuck, a housing adjustably supported by said frame below said chuck, a member slidably supported by said housing, an adjustable stop at the upper end of said member, a rack on the lower end of said member, a gear rotatably supported in said housing continuously in mesh with said rack, and means for intermittently oscillating said gear whereby said stop is moved into and out of a position in alignment with said chuck.

5. A metalworking machine comprising a frame, a turret rotatably supported by said frame, a plurality of spindles adapted to have work fed through the center thereof supported in said turret and spaced equally about the axis thereof, means for indexing said turret whereby said spindles are indexed through a plurality of stations, means for feeding work through said spindles, a housing on said frame adjacent the forward end of said spindles, means for adjusting said housing along said frame in a direction parallel to the axis of rotation of said turret, a work stop or gauge slidably supported by said housing for vertical reciprocation, and means for reciprocating said work stop or gauge vertically in predetermined timed relation to the operation of the feeding means.

6. A metalworking machine comprising a turret, a plurality of spindles adapted to have work fed through the center thereof supported in said turret and spaced equally about the axis thereof, means for indexing said turret whereby said spindles are indexed through a plurality of stations, means for feeding work through said spindles, a work stop or gauge reciprocable in a plane substantially normal to the axis of rotation of the spindles, a rack on said work stop or gauge, a gear in mesh with said rack, and means for intermittently oscillating said gear whereby said work stop or gauge is reciprocated transversely of the spindles into and out of a position in alignment therewith during the feeding operation.

7. A metalworking machine comprising a turret, a plurality of spindles adapted to have work fed through the center thereof supported in said turret and spaced equally about the axis thereof, means for indexing said turret whereby said spindles are indexed through a plurality of stations, means for feeding work through said spindles at one of said stations, a work stop or gauge slidably supported adjacent the feeding station and reciprocable in a plane substantially normal to the axis of rotation of the spindles, a rack on said work stop or gauge, a gear in mesh with said rack, and means for oscillating said gear whereby said work stop or gauge is reciprocated transversely of the spindles into and out of a position in axial alignment therewith in the feeding station.

HARRY W. RUPPLE.